United States Patent [19]

Greene

[11] 4,399,088

[45] Aug. 16, 1983

[54] PROCESS AND MOLDING APPARATUS HAVING A MOLD RELEASE COATING ON THE CAVITY THEREOF FOR MOLDING FORMABLE AND HOMOGENEOUS CERAMIC/POLYESTER RESIN MOLDING COMPOSITION

[75] Inventor: Waldo R. Greene, Voorheesville, N.Y.

[73] Assignee: PCI Group, Inc., New Bedford, Mass.

[21] Appl. No.: 249,158

[22] Filed: Mar. 30, 1981

[51] Int. Cl.$^3$ .................. B29D 27/04; B29C 1/04; B28B 7/36

[52] U.S. Cl. .................. 264/54; 249/115; 264/338; 264/DIG. 5

[58] Field of Search .................. 264/338, 51, 331.19, 264/54, DIG. 5; 249/115

[56] References Cited

U.S. PATENT DOCUMENTS

| | | | |
|---|---|---|---|
| 2,098,536 | 11/1937 | Hale et al. | 91/68 |
| 2,564,308 | 8/1951 | Nagel | 18/47 |
| 2,627,938 | 2/1953 | Frohmader et al. | 183/45 |
| 2,628,187 | 2/1953 | Frohmader et al. | 167/82 |
| 2,851,330 | 9/1958 | Taylor | 18/47 |
| 2,902,376 | 9/1959 | Beacher et al. | 106/10 |
| 2,923,041 | 2/1960 | Ryznar | 22/192 |
| 2,982,759 | 5/1961 | Heuse | 260/79.3 |
| 2,998,401 | 8/1961 | Reavis et al. | 260/32.8 |
| 3,012,016 | 12/1961 | Kirk et al. | 260/79.5 |
| 3,060,145 | 10/1962 | Moscrip | 260/41 |
| 3,079,218 | 2/1963 | DiGiulio et al. | 18/54 |
| 3,139,412 | 6/1964 | Sterling | 260/23 |
| 3,215,599 | 11/1965 | Thau et al. | 167/63 |
| 3,240,618 | 3/1966 | Hemming | 117/5.1 |
| 3,253,932 | 5/1966 | White et al. | 106/38.22 |
| 3,258,340 | 6/1966 | Riboni | 96/87 |
| 3,297,609 | 1/1967 | Hagemeyer et al. | 260/28.5 |
| 3,424,607 | 1/1969 | Coscia | 117/5.1 |
| 3,450,551 | 6/1969 | Ware et al. | 117/5.1 |
| 3,978,018 | 8/1976 | Self | 260/40 R |
| 4,011,195 | 3/1977 | Self | 260/40 R |
| 4,013,614 | 3/1977 | Self | 260/40 R |

FOREIGN PATENT DOCUMENTS 455863  5/1975  U.S.S.R. .................. 264/115

OTHER PUBLICATIONS

*Chemical Abstracts,* vol. 70, No. 14, 37–Plastics Fabrication and Uses–58690, 58682k, "Mold-Release Agents for Polyurethanes Containing Polyolefins and Reaction Products of Dicyclopentadiene and Phenols," 3,423,503, 1/69, York, Monte H., (264–338), Apr. 7, 1969, p. 35.

*Chemical Abstracts,* vol. 75, No. 8, 37–Plastics Fabrication and Uses–50141, 50135s, "Mold Release Agent for Use in Molding Polyurethane Foam Materials," 3,577,501, 5/71, York, Monte H., (264–213), Aug. 23, 1971, p. 41.

A–C Polyethylene . . . the Essential Ingredient, Allied Chemical (1978), 16 p. Brochure.

Witco Chemical–Sonneborn Division Brochure (5 pp.) (undated).

A–C Polyethylene Urethane Mold Release Agent (or compound), Allied Chemical, 1978, sheet PL-2.

Reprint from Cosmetics and Toiletries, I. B. Chang, Allied Chemical Co., Morristown, NJ, (2 pp., undated).

Williams, Ira, "The Plasticity of Rubber and Its Measurement", in *Industrial and Engineering Chemistry,* vol. 16, No. 4, pp. 362–364.

Bernhardt, Ernest C., Ed. "Processing of Thermoplastic Materials", New York, Reinhold, ©1959, pp. 600; 602.

Billmeyer, Jr., Fred W., "Textbook of Polymer Science", Second Edition, New York, Wiley-Interscience, ©1971, pp. 6, 62–67, 75–93.

*Primary Examiner*—Philip E. Anderson
*Attorney, Agent, or Firm*—John P. Morley

[57] ABSTRACT

A mold release agent designed for use with ceramic/polyester molding compositions is disclosed. The mold release agent comprises 15–30 weight percent polyethylene having a molecular weight of 15,000 to 30,000 and 70–85 weight percent of a mineral oil of 345–355 Saybolt Seconds Universal (SSU) at 100° F. In a preferred molding procedure the surface of the mold is uniformly coated to a thickness of 0.5–2 mm with the mineral oil/polyethylene composition by melt-flow at 200°–300° F.

8 Claims, No Drawings

PROCESS AND MOLDING APPARATUS HAVING A MOLD RELEASE COATING ON THE CAVITY THEREOF FOR MOLDING FORMABLE AND HOMOGENEOUS CERAMIC/POLYESTER RESIN MOLDING COMPOSITION

BACKGROUND OF THE INVENTION

Blends of ceramic material and polyester resin are marketed by the Tanner Chemical Company under the trademarks CERFOAM and CERPOL as molding compositions for a variety of end use applications. These molding compositions are described in U.S. Pat. Nos. 3,978,018, 4,013,614 and 4,011,195 issued to James M. Self. These new molding compositions are two-part systems, a part "A" consisting of a general purpose polyester resin in admixture with a filler such as hydrated alumina and/or calcium carbonate and a part "B" containing sodium silicate or aqueous alkali stabilized collodial silica, hydrated alumina and a catalyst. These new molding compositions show great promise for replacing conventional epoxy/fiberglass materials used as building panels, shower and tub enclosures, etc.

Notwithstanding the significant cost advantages over conventional fiberglass compositions, in terms of both raw material costs and processing costs, the new ceramic/polyester molding compositions have not previously been commercially utilized in processes where such compositions would come into direct contact with a mold surface. The problem inhibiting such utilization is that the ceramic/polyester molding compositions have proven to be unusually tenacious in their adherence to mold surfaces. While a great number of excellent mold release agents are commercially available, the numerous commercial agents which have been tested in the molding of the ceramic/polyester resins have proven to be totally unsatisfactory. Specifically, attempts to mold such compositions with microcrystalline waxes, solutions of co-polymers of ethylene and vinyl acetate, and various combinations of the foregoing, proved to be largely ineffective as mold release agents in the molding of the ceramic/polyester compositions. The use of silicone release agents is impractical because the film remaining on the surface of the molded part precludes the painting of the molded surface. Polyethylene dissolved in toluene proved to be a very poor release agent for such systems and various mineral oils which were tested as release agents were totally inoperative.

Aside from the problem of release per se, the conventional technique for applying mold release agents to molds previous to the molding of tubs, shower stalls, etc. is itself a problem. According to conventional fiberglass molding practice, a wax-like release agent is applied to the mold surface and buffed down to a very thin coating after each application. Thus, the conventional technique is labor intensive and time consuming.

In the present invention, in attempting to find a suitable mold release agent for CERPOL and CERFOAM molding compositions, environmental considerations were also taken into account. Because of the imposition of stricter laws regarding the working environment and clean air standards, a need for solvent-free mold release agents exists in the industry.

SUMMARY OF THE INVENTION

While, as noted above, polyethylene solvent solutions, mineral oils and various combinations thereof have proven to be ineffective in the molding of the ceramic/polyester molding compositions, it has now been unexpectedly discovered that the combination of a polyethylene of a specific molecular weight and a mineral oil of a narrowly defined viscosity range, when admixed in certain critical proportions, affords an excellent release agent for the molding of ceramic/polyester compositions. Specifically, a substantially solvent-free mixture of the following composition has proven to be an excellent mold release agent for the ceramic/polyester molding compositions:

15–30 weight percent polyethylene having a molecular weight greater than about 15,000; and
70–85 weight percent of a mineral oil of 345–355 SSU at 100° F.

The mold release agent of the present invention is prepared by heating the mineral oil of 345–355 Saybolt seconds Universal (SSU) together with 15–30 weight percent polyethylene of a molecular weight in excess of 15,000 until a clear molten solution is obtained having a viscosity slightly greater than that of the mineral oil alone. The heat is then removed and the molten solution is homogenized, i.e. mixed to disperse the polyethylene uniformly throughout the mineral oil, using any standard homogenizer or colloid mill. Homogenization is continued until the mixture has cooled to a temperature of at least 10° C. below the cloud point of the mixture. The thus prepared release agent is then applied to the mold surface and spread with heating (200° F. to 300° F.) to provide a uniform thin coating over the mold surface. The CERPOL or CERFOAM molding composition is then applied to the thus prepared mold surface, cured, and removed from the mold.

It has been discovered that the release agent of the present invention will melt-flow, i.e., spread itself as a melt over the mold surface to form a coating which, upon cooling, is smooth and even. Thus, the present invention dispenses with the need for repeated application and buffing steps as in conventional practice.

Accordingly, it is an object of the present invention to provide a solvent-free composition which will act as a mold release agent when exposed to the highly adhesive polyester/ceramic molding compositions and the heat generated by the exothermic reactions accompanying their cure. Another object is to provide a process for molding ceramic/polyester compositions in an efficient manner with clean separation from mold surfaces. Other objects are to provide a release agent suitable for the molding of ceramic/polyester systems which is both highly viscous and stable, and to provide such a mold release agent which can easily be applied as a smooth, even coating.

These and other objects and features of the invention will become apparent from the following description.

DESCRIPTION

As previously noted, the present invention is concerned with the molding of the new ceramic/polyester molding compositions such as those marketed by the Tanner Chemical Company under the tradenames CERPOL and CERFOAM. The CERPOL and CERFOAM systems are two-phase systems which are mixed at the time of use. The molding compositions consist essentially of a resin phase (phase "A") containing polyester and a filler such as hydrated alumina and/or calcium carbonate, and an aqueous phase (phase "B") containing an aqueous alkali-stabilized colloidal silica or aqueous solution of alkali silicate in combination with a filler. As disclosed in the aforementioned U.S. Pat. Nos. 3,978,018, 4,011,195 and 4,013,614, the teachings of which are incorporated herein by reference, the fillers for the separate phases may be active fillers such as hydrated alumina or other hydrated metallic salts or oxides and/or inert fillers such as silica or calcium carbonate. In the CERFOAM compositions, calcium carbonate or a blend of calcium carbonate and alumina is included in the resin phase "A". The calcium carbonate reacts with the aqueous "B" phase to liberate carbon dioxide as a blowing agent, thus forming the cellular foam product. For best results all fillers should be minus 325 mesh, especially if the molding composition is to be applied to the mold by means of a spray gun. Preferably the viscosity of resin phase "A" should be 300 to 600 cps at 72° F. and the viscosity of aqueous phase "B" should be 200 to 500 cps at 72° F., with the viscosity of aqueous phase "B" 100 to 150 cps below the viscosity of resin phase "A".

One convenient technique for mixing the two phases of the molding composition and applying the mixed composition to a mold is by use of a dual head spray gun or a spray gun having a mixing chamber as described in Example 9 of U.S. Pat. No. 4,011,195. As further described there, a glass roving chopper may be used in conjunction with the spray gun to introduce glass fiber into the molding composition as it is applied to the mold surface.

In general, mineral oils are suitable mold release agents for unsaturated polyester resins and are stable at the temperatures produced within a mold by the exothermic reactions involved in the curing of molding compositions such as CERPOL and CERFOAM. However, it has been found that both mineral oil and mineral oils gelled with polyethylene as disclosed in U.S. Pat. Nos. 2,627,938 and 2,628,187 lack the requisite properties to serve as release agents in the molding of CERPOL and CERFOAM compositions because the mineral oil component tends to be absorbed into the molded matrix.

It has been discovered that the nature of the mineral oil itself as well as the amount of polyethylene dissolved therein are critical to successful service as mold release agents for such molding compositions. A SONNEBORN white oil marketed by Witco Chemical under the trademark KAYDOL having a viscosity of 345–355 SSU at 100° F. has been successfully employed in the formulation of mold release agents in accordance with the present invention. On the other hand, a mineral oil of 320–330 SSU at 100° F., marketed by Witco Chemical under the trademark ORZOL, will not provide a satisfactory mold release agent, even when admixed with 15 to 30 percent by weight polyethylene. Mineral oils of lesser viscosity are likewise unsatsifactory. It is preferred that the mineral oil be reagent grade.

The polyethylene used in the mold release agents of the present invention is a homopolymer having an average molecular weight in excess of 15,000. Polyethylene homopolymers of 8,000; 10,000; and 15,000 molecular weights, when formulated with mineral oil in accordance with the present invention, do not provide compositions having the capability of serving as mold release agents for the aforementioned molding compositions. A polyethylene homopolymer having an average molecular weight of about 20,000 provides an optimum mold release agent in accordance with the present invention.

The release agents of the invention contain 15 to 30 percent by weight of a polyethylene having the aforementioned molecular weight and 70–85 percent by weight of a mineral oil of the aforementioned characteristics. Compositions containing less than 15 percent by weight polyethylene lack the requisite viscosity for the objectives of the invention. The 30 percent upper limit for the amount of polyethylene is not particularlay critical but serves to define compositions which are most easily applied yet possess the requisite mold release properties.

In the practice of the invention, the petroleum oil and polyethylene are admixed and heated to about 140° C. until a clear molten solution is obtained which has a viscosity slightly greater, e.g., about 250 cps greater, than that of the mineral oil constituent alone at the same temperature. After a clear molten solution is obtained it is removed from the heat and homogenized, i.e., mixed to disperse the polyethylene uniformly throughout the mineral oil. Any suitable homogenization technique may be employed for dispersion of the polyethylene such as, for example, a colloid mill, various homogenizing mills and the like. The homogenization is preferably continued until the solution has cooled to a temperature of at least 10° C. below the cloud point of the mixture. Such a temperature differential has been found to be important to the production of a satisfactory mold release agent. If homogenization is halted at a higher temperature relative to the cloud point, a consistently uniform product is difficult to obtain.

The mold release agent formulated as described above is applied to the mold, for example, by hand application, and spread with application of heat uniformly over the mold to a thickness of 0.5–2 mm. The release agent may be melt-flowed over the entire mold at a temperature of 200° F.–300° F. by means of a heat gun, hot air, or infra-red lamp. Upon cooling, a smooth, even coating is formed.

It is believed that the mineral oil primarily serves an anti-adhesive function and that the polyethylene prevents adsorption of the mineral oil into the matrix of the molded part. A coating 0.5–2 mm in thickness is heavy enough to provide for clean release of the molding from the mold and thin enough to accept the impression from the mold into the matrix. The mold release agent forms suitable release coatings on molds fabricated of plastic (e.g. acrylic), wood, cardboard, and metal.

EXAMPLE

A four foot by eight foot plastic mold for a wall panel having a stone facade on its face was coated to a thickness of about 2.0 mm with a mold release agent consisting of 20.2 weight percent of a polyethylene of molecular weight of 22,000 and 79.8 weight percent of KAYDOL, a SONNEBORN white oil having a viscosity of 345–355 SSU at 100° F. marketed by Witco Chemical. The mold release agent was applied to the mold surface by hand as a thick, greasy coating. The coated mold surface was then heated to a surface temperature of 250° F. for one minute by means of an infra-red lamp whereby the mold release coating spread evenly over the mold by melt-flow. After one minute the heat source was removed and the coated mold allowed to cool to room temperature (about 10 minutes). The result was a smooth coating averaging about 1.72 mm in thickness. A BINKS spray gun was then used to mix CER- FOAM "A" and "B" phases and to apply the mixed composition to the mold surface. After self-curing for about 35 minutes, the molded CERFOAM was lifted from the mold from which it easily and cleanly separated. CERPOL compositions, if substituted for the CERFOAM, work equally well.

The invention may be embodied in other specific forms without departing from the spirit or essential characteristics thereof. The preferred embodiments described above are therefore to be considered in all respects as illustrative and not restrictive, the scope of the invention being indicated by the appended claims rather than by the foregoing description, and all changes which come within the meaning and range of the equivalency of the claims are therefor intended to be embraced therein.

What is claimed is:

1. A process for molding comprising the steps of:
   A. coating a mold surface with a release agent consisting essentially of 15-30 weight percent of a polyethylene having an average molecular weight within the range of 15,000 to 30,000 and 70-85 weight percent of a mineral oil of 345-355 SSU at 100° F. and where the polyethylene and mineral oil can be admixed and heated to about 140° C. to obtain a clear molten solution which has a viscosity about 250 cps greater than that of the mineral oil alone at the same temperature;
   B. applying to the coated mold surface a molding composition comprising a polyester resin and an aqueous, alkali stabilized silica;
   C. curing the molding composition and,
   D. separating the mold surface from the cured composition.

2. The process of claim 1 wherein said polyethylene has an average molecular weight of about 20,000.

3. The process of claim 1 comprising the additional step of heating the release agent to 200° F.-300° F. to distribute the agent evenly over the mold surface prior to step c.

4. The process of claim 3 wherein the coating thickness of the release agent is 0.5-2 mm.

5. The process of claim 1 wherein the molding composition includes a blowing agent selected from the group consisting of calcium carbonate or a blend of calcium carbonate and alumina.

6. A structure for molding comprising in combination:
   A. a mold having a mold surface; and
   B. a mold release agent on said surface consisting essentially of a substantially solvent-free blend of 15-30 weight percent of a polyethylene having an average molecular weight within the range of 15,000 to 30,000 and 70-85 weight percent of a mineral oil of 345-355 SSU at 100° F. and where the polyethylene and mineral oil can be admixed and heated to about 140° C. to obtain a clear molten solution which has a viscosity about 250 cps greater than that of the mineral oil at the same temperature.

7. The structure of claim 6 wherein said polyethylene has a molecular weight of about 20,000.

8. The structure of claim 6 wherein said release agent comprises about 80 weight percent mineral oil.

* * * * *